Patented June 1, 1937

2,082,569

UNITED STATES PATENT OFFICE 2,082,569

VINYLETHINYL DERIVATIVES AND PROCESS FOR PREPARING SAME

Wallace H. Carothers and Ralph A. Jacobson, Arden, Del., assignors to E. I. du Pont de Nemours & Company, Wilmington, Del., a corporation of Delaware No Drawing. Original application November 11, 1931, Serial No. 574,359. Divided and this application June 16, 1934, Serial No. 730,916

19 Claims. (Cl. 260—6)

This invention relates to the preparation of new derivatives of vinylacetylene. More particularly it relates to the preparation of derivatives of vinylacetylene in which the acetylenic hydrogen atom has been replaced. Still more particularly it relates to the preparation of these substituted vinylacetylenes from alkali metal vinylacetylides. Still more particularly it relates to the reactions of alkali metal vinylacetylides with compounds containing an inorganic strong acid radical.

This application is a division of application, Serial No. 574,359, filed November 11, 1931, now U. S. Patent No. 1,963,934, which describes the preparation of the alkali metal vinylacetylides which are used in the process of the present invention.

It is an object of the present invention to produce new derivatives of vinylacetylene. A further object of the invention is to produce these new derivatives by reacting an alkali metal vinylacetylide with a compound containing an inorganic strong acid radical. Other objects will appear hereinafter.

These objects are accomplished by reacting an alkali metal vinylacetylide, prepared as described hereinafter, with a compound containing an inorganic strong acid radical. Among these may be mentioned organic halides, such as triphenylchloromethane, benzyl chloride, allyl bromide, ethyl iodide, heptyl chloride, butyl bromide, esters of sulfuric acid, such as diethyl sulfate, dibutyl sulfate, dimethyl sulfate, alkyl esters of aryl sulfonic acids, such as butyl paratoluene sulfonate, ethyl xylene sulfonate and amyl benzene sulfonate. The course of these reactions is illustrated by the following equations:

CH$_2$=CH—C≡CNa + (C$_6$H$_5$)$_3$CCl →
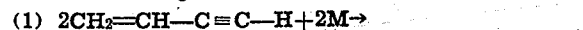
CH$_2$=CH—C≡C—C(C$_6$H$_5$)$_3$ + NaCl 2CH$_2$=CH—C≡CLi + (C$_2$H$_5$)$_2$SO$_4$ →
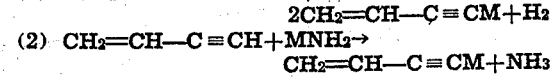
2CH$_2$=CH—C≡C—C$_2$H$_5$ + Li$_2$SO$_4$ CH$_2$=CH—C≡CK + CH$_3$C$_6$H$_4$SO$_3$C$_4$H$_9$ →
CH$_2$=CH—C≡C—C$_4$H$_9$ + CH$_3$C$_6$H$_4$SO$_3$K Other halides than those mentioned above may be used including halides of mercury, silicon, germanium, tin, phosphorus, arsenic, antimony and bismuth. The nature of the reaction of these latter materials with the alkali metal vinylacetylide is illustrated by the following equations:

CH$_2$=CH—C≡CNa + HgCl$_2$ →
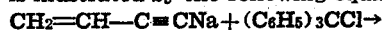
CH$_2$=CH—C≡CHgCl + NaCl;

CH$_2$=CH—C≡C—HgCl + CH$_2$=CH—C≡CNa →
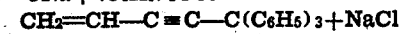
(CH$_2$=CH—C≡C)$_2$Hg + NaCl

The alkali metal vinylacetylides are prepared by treating monovinylacetylene with an alkali metal or an alkali metal amide. Reaction proceeds according to the following equations:

(1) 2CH$_2$=CH—C≡C—H + 2M →
2CH$_2$=CH—C≡CM + H$_2$ (2) CH$_2$=CH—C≡CH + MNH$_2$ →
CH$_2$=CH—C≡CM + NH$_3$

To carry out the preparation of an alkali vinylacetylide according to the first of these methods we have only to bring the vinylacetylene into contact with the alkali metal. This may be done by adding the alkali metal to the liquid vinyl acetylene or to a solution of the vinyl acetylene. Or the alkali metal may be dissolved in liquid ammonia and the vinyl acetylene slowly added to this solution. The preparation of the alkali metal vinylacetylides by the direct action of the alkali metal on vinyl acetylene, however, is sometimes accompanied by side reactions apparently consisting for the most part in polymerization of the vinyl acetylene or its alkali metal derivative, and the alkali metal acetylide is then contaminated with by-products from which it is not readily freed. For this reason our generally preferred method of preparing vinylacetylides of the alkali metals is that represented by the second equation.

According to this method we bring together monovinyl acetylene with an alkali metal amide such as lithium amide, sodium amide, potassium amide, rubidium amide, caesium amide, etc., either in the presence of a solvent or diluent or not. This method is illustrated by the following example.

EXAMPLE 1

*Preparation of sodium vinylacetylide*

Nineteen and five tenths grams (0.5 mol.) powdered sodamide was slowly added to a solution of 75 g. monovinyl acetylene in 250 cc. liquid ammonia and the mixture stirred for six hours. The ammonia was evaporated in a current of nitrogen and the solid residue warmed to 60° C. in an atmosphere of nitrogen. The sodium vinylacetylide obtained in this manner was a white powder of great reactivity. When heated in the presence of air, it ignited spontaneously, and in the absence of an inert diluent, it reacted explosively with many types of compounds. Analysis of the acetylide by careful decomposition with water showed that at least 82% of the monovinyl acetylene was regenerated. Instead of liquid ammonia, other inert solvents such as ethyl ether, butyl ether, or hydrocarbons may be employed.

It is also possible to prepare sodium vinylacetylide by allowing gaseous monovinyl acetylene to act directly on sodamide.

The preparation of other alkali vinylacetylides such as lithium vinylacetylide and potassium vinylacetylide can also be carried out by using lithium amide and potassium amide in place of sodium amide as illustrated above. These vinylacetylides are also white powders insoluble in hydrocarbon solvents and very reactive toward air, carbon dioxide, water, etc. When carefully protected from the action of air, moisture, etc., they may however be stored for a considerable period of time without deterioration.

While the above description would indicate that the alkali metal vinylacetylides are prepared and isolated, before reaction with the compound containing the inorganic strong acid radical, this is not necessary and, in general, is not desirable. Instead the reaction mixture in which the alkali metal vinylacetylides are formed may be treated directly with the material with which it is desirable to cause them to react.

It should be mentioned that vinylethinyl compounds containing two or more vinylethinyl groups show a great tendency to polymerize, and this tendency in certain cases is so great as to make it difficult or impossible to isolate the compound, as such, in an unpolymerized state.

The reactant and the alkali vinylacetylide may be brought together in any appropriate manner consistent with the physical properties of the reacting materials as will be fully illustrated below. In this connection it is necessary to take into account the extraordinary reactivity of the alkali vinylacetylides. This great reactivity makes it desirable to have the reactants and any solvents that may be used in connection with them as dry as possible and free of alcohols, acids, etc. In general it is necessary to bring the reactant and the alkali vinylacetylide together slowly, e. g., by adding the reactant in portions to the alkali compound, or by adding the alkali compound in portions to the reactant. In this connection it may be observed that the alkali vinylacetylides although they are rather inflammable, and although they deteriorate considerably after a time when freely exposed to the air, are nevertheless sufficiently stable to be handled as such in the powder form. In general, however, it is more convenient and more satisfactory not to attempt to isolate the alkali vinylacetylide as such, but to use it directly in the presence of the medium in which it is prepared. Thus if the vinylacetylide is made in the presence of liquid ammonia or dry ether or benzene, the reactant may be added directly to the ammonia, ether, or benzene in which the vinylacetylide is suspended. In most cases the presence of a liquid of this kind, which may function as a solvent and diluent for the reaction is very advantageous, since it moderates the vigor of the reaction and makes it possible to obtain thorough mixing which, toward the end of the reaction, may be otherwise difficult.

The reactions of the alkali vinylacetylides are in general not only very rapid but strongly exothermic, and for this reason it is usually desirable to arrange for a very thorough cooling of the vessel in which the reaction is carried out. Stirring is also advantageous especially since the alkali vinylacetylides are in general only slightly soluble in liquids that are sufficiently inert to serve as media for their reactions.

We have found that it is possible to carry out the reactions of the alkali vinylacetylides in such a way as to have them formed in the presence of the compound with which they are expected to react. To carry out reactions in this fashion the (liquid) monovinylacetylene is mixed with the reactant, and to the mixture is added, preferably with efficient stirring and in the presence or absence of a diluent such as ether, the finely divided alkali amide. Thus if it is desired to bring about the reaction of sodium vinyl acetylide with an alkyl sulfate, monovinylacetylene may be mixed with an equimolecular quantity of the alkyl sulfate together with an equal volume of dry ether, and an equimolecular quantity of finely powdered sodamide added in portions with stirring to the cooled mixture. It is probable that under these conditions the sodamide reacts with the vinyl acetylene to form vinylacetylide which then reacts with the alkyl sulfate almost as rapidly as it is formed. This method of carrying out the reaction is very convenient and in many cases gives exceptionally high yields of the expected products. It is possible also in many cases to add the sodamide to the reactant and then add the vinylacetylene subsequently. This phase of the invention is also applicable to the other compounds containing an inorganic strong acid radical which are disclosed above.

The nature of the present invention may be better understood from the following examples which are not to be construed as limiting the invention but which are intended to be illustrative only.

EXAMPLE 2

*Methyl vinylacetylene*

$$(CH_2=CH-C\equiv C-CH_3)$$

Fifty-eight and five tenths grams (1.5 mols) powdered sodamide was slowly added to a solution of 104 g. monovinylacetylene in 300 cc. liquid ammonia contained in a suitable apparatus. After 3 hours, 189 g. (1.5 mols) dimethyl sulfate was slowly added to the mixture. Vigorous reaction occurred as the dimethyl sulfate dropped into the mixture. After evaporation of the ammonia, the methyl vinyl acetylene was distilled from the reaction flask. The yield of liquid methyl vinylacetylene was 38%.

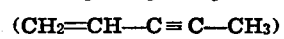

$B_{759.5mm}$. 59.2° C.; $N_D^{20°C.}$ 1.4496; $D\frac{20°C.}{4°C.}$ 0.7401

EXAMPLE 3

*Ethyl vinylacetylene*

$$(CH_2=CH-C\ C-C_2H_5)$$

This compound was prepared from sodium vinylacetylide and diethyl sulfate by the above procedure. Yield 42.5%.

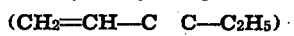

$B_{758mm}$. 84.5–85.3°C.; $N_D^{20°C.}$ 1.4522; $D\frac{20°C.}{4°C.}$ 0.7492

Dipropyl and dibutyl sulfates, as well as numerous other organic sulfates may be used in a manner similar to that described in connection with the dimethyl and diethyl sulfates.

The action of sodium vinylacetylide on an ester of p-toluene sulfonic acid is illustrated in Example 4.

EXAMPLE 4

One hundred four grams of monovinylacetylene was dissolved in 200 cc. of n-butyl ether and the thoroughly cooled mixture was slowly treated with stirring with 58.5 g. of powdered sodamide. After the completion of the reaction 300 g. of ethyl p-toluene sulfonate dissolved in 200 cc. of butyl ether was slowly added to the mixture during the course of several hours. The mixture was finally heated for a time on the water bath. It was then treated with cold water and dilute sulfuric acid, the ethereal layer was separated, dried, and distilled. The distillate yielded 28.5 g. of ethyl vinylacetylene (24% of the theory) identical in its properties with the material described in Example 3.

Other sulphonates, e. g., methyl benzene sulfonate, butyl xylene sulfonates, benzyl p-toluene sulfonate, and the like, will react similarly to ethyl p-toluene sulfonate.

The action of sodium vinylacetylide on an alkyl halide is illustrated in Examples 5 and 6.

EXAMPLE 5

Butyl monovinylacetylene $(CH_2=CH-C \equiv C-C_4H_9)$

To a solution of 75 g. monovinylacetylene in 400 cc. liquid ammonia was slowly added 39 g. (1 mol.) powdered sodamide. After 3 hours, 137 g. of butyl bromide (1 mol.) was slowly added during the course of 4 hours. The mixture was allowed to stand overnight during which the ammonia evaporated. Water and dilute sulfuric acid were added, the upper layer separated, dried with calcium chloride and distilled. Yield of butyl monovinylacetylene, 65%.

$B_{50mm.}$ 59-60° C.; $D\frac{20° C.}{4° C.}$ 0.7830; $N_D^{20° C.}$ 1.4592

EXAMPLE 6

Heptyl monovinylacetylene $(CH_2=CH-C \equiv C-C_7H_{15})$

This compound was prepared from sodium vinylacetylide and heptyl bromide by the procedure described in Example 4. Yield 52%.

$B_{9mm.}$ 74.5°C.; $N_D^{20°C.}$ 1.4606; $D\frac{20° C.}{4° C.}$ 0.7962

Examples 1 to 5 illustrate the synthesis of alkyl substituted monovinylacetylenes by reacting an alkali metal vinyl acetylide with a non-carboxylic acid ester. The process is applicable to the formation of the substituted monovinylacetylenes containing organic radicals other than alkyl, e. g. aralkyl, by using an ester other than an alkyl ester. These hydrocarbons are new compounds and constitute important starting materials for the preparation of valuable synthetic derivatives having great utility in the arts. They readily polymerize under the influence of common polymerizing agents, for example, oxygen (air), light, pressure, elevated temperature, oxidation catalysts, etc., to form polymers varying from viscous, transparent liquids to resinous solids. The polymers vary in color from a light yellow to a deep brown, and are transparent.

The above description and specific examples are capable of considerable variation without departing from the spirit of the invention. Any modification which conforms to the concept of the invention is intended to be included within the scope of the claims.

We claim:

1. The process which comprises reacting an alkali metal vinylacetylide with a compound containing an inorganic strong acid radical of the class consisting of alkyl halides, aralkyl halides, alkyl sulfates and alkyl esters of aryl sulfonic acids.

2. The process which comprises mixing monovinylacetylene and a compound containing an inorganic strong acid radical of the group consisting of alkyl halides, aralkyl halides, alkyl sulfates, and alkyl esters of aryl sulfonic acids and then adding to the resulting mixture an alkali metal amide.

3. The process which comprises reacting with an alkali metal vinylacetylide an alkyl ester of an inorganic strong acid.

4. A compound having the formula:

$CH_2=CH-C \equiv C-R$ in which R is a saturated monovalent hydrocarbon radical which contains at least one carbon atom which is aliphatic in character and thru which it is attached to the vinyl acetylene radical.

5. Butyl vinylacetylene of the formula $C_4H_9-C \equiv C-CH=CH_2$

6. The process of claim 1 characterized in that it is carried out in the presence of an inert diluent.

7. The process of claim 1 characterized in that it is carried out in the presence of an inert diluent of the class consisting of liquid ammonia and ether.

8. The process of claim 1 characterized in that the compound containing the inorganic strong acid radical is added to the alkali vinylacetylide gradually in the presence of an inert diluent.

9. The process of claim 2 characterized in that the alkali metal amide is added gradually to the mixture containing the monovinylacetylene in the presence of an inert diluent and in that the reaction mass is cooled and stirred during reaction.

10. The process which comprises gradually adding an alkali metal amide to monovinylacetylene in the presence of an inert diluent with cooling and agitation of the reaction mixture and thereafter, while continuing the cooling and agitation, adding gradually to the mixture a compound containing an inorganic strong acid radical of the class consisting of alkyl halides, aralkyl halides, alkyl sulfates and alkyl esters of aryl sulfonic acids.

11. The process which comprises reacting an alkali metal vinylacetylide with an alkyl halide in the presence of an inert diluent.

12. The process which comprises reacting sodium vinylacetylide with a lower saturated alkyl bromide in the presence of an inert diluent, said reaction being brought about by adding the alkyl bromide gradually to the alkali metal vinylacetylide.

13. The process of claim 1 characterized in that it is carried out in the presence of an inert diluent and in that the resulting vinylacetylide is isolated by distillation.

14. The process which comprises reacting an alkali metal vinyl acetylide with an alkyl sulfate in the presence of an inert diluent.

15. A compound having the formula $CH_2=CH-C \equiv C-R$ in which R is a saturated alkyl radical.

16. A polymer of a compound as described in claim 4.

17. The process of polymerizing a compound as described in claim 4, which comprises exposing the compound to a polymerizing agent.

18. Methyl vinylacetylene of the formula $CH_3-C \equiv C-CH=CH_2$

19. Ethyl vinylacetylene of the formula $C_2H_5-C \equiv C-CH=CH_2$

WALLACE H. CAROTHERS.
RALPH A. JACOBSON.